United States Patent [19]

Kuwica

[11] Patent Number: 4,813,135

[45] Date of Patent: Mar. 21, 1989

[54] ROLLER NOSE BAR

[76] Inventor: Daniel Kuwica, 1756 Shannon Court, Coquitlam, British Columbia, Canada, V3J 6C6

[21] Appl. No.: 106,878

[22] Filed: Oct. 13, 1987

[51] Int. Cl.[4] .............................................. B23D 57/02

[52] U.S. Cl. ......................................... 30/384; 30/387

[58] Field of Search ................. 30/381, 382, 383, 384, 30/385, 386, 387; 83/825

[56] References Cited

U.S. PATENT DOCUMENTS

| | | | |
|---|---|---|---|
| 2,532,981 | 12/1950 | Wolfe | 30/385 |
| 3,602,274 | 5/1969 | Barrett | 30/384 X |
| 4,492,030 | 1/1985 | Beerens | 30/384 |
| 4,722,141 | 2/1988 | Lim et al. | 30/387 X |

FOREIGN PATENT DOCUMENTS

| | | | |
|---|---|---|---|
| 493111 | 5/1953 | Canada | 30/386 |

*Primary Examiner*—Frank T. Yost
*Assistant Examiner*—Michael D. Folkerts
*Attorney, Agent, or Firm*—Fulwider, Patton, Rieber, Lee & Utecht

[57] ABSTRACT

A nose roller tip for a cutter bar of a chain saw. There is a mounting web to engage the cutter bar. A pair of rollers are each mounted on opposed sides of the mounting web. There are outer plates, one adjacent each roller. The mounting web, rollers and outer plates are attached together to allow free rotation of the roller relative to the nose roller tip.

6 Claims, 1 Drawing Sheet

ROLLER NOSE BAR

FIELD OF THE INVENTION

This invention relates to a nose roller tip useful in a chain saw.

DESCRIPTION OF THE PRIOR ART

A chain saw is a piece of equipment that finds wide application and may be considered essential to modern logging. It comprises a small motor mounted in a housing. The housing is provided with handles for the operator. The motor drives a sprocket through a clutch and the sprocket drives the chain that carries out the cutting. The chain is supported on a cutting bar extending from the housing. The chain traverses the periphery of the bar as it cuts. The bar is provided with a peripheral slot to guide the chain. At the tip of the cutter bar, remote from the housing, the modern practice is to incorporate some means of reducing friction as the chain passes around the tip.

The earliest chain saws simply extended the channel around the tip but as the chain changes direction around the tip the frictional build up is substantial. Accordingly, means were sought to reduce the effect of the friction.

An early idea was the use of rollers with a mounting web between the rollers, an inner bearing race and roller bearings, riveted together to form a roller nose tip for the chain. However, it was generally found that the design of the mounting web was such that the web lacked the strength necessary to withstand the constant saw chain pounding and was susceptible to bending during use, particularly when the tip was pinched in a cut. Bending would frequently occur in the process of freeing the pinched tip. The area where the bar joined the rollers was vulnerable to wear as the chain strikes this area strongly and persistent use of the tip area for limbing and boring created fatigue in the tip area, eventually leading to failure. Unfortunately, the mounting web of the bar could not be strengthened because it has to hold the roller assembly and has to be small enough to have the drive links passed around it.

A further attempt to reduce the effects of friction at the tip of the cutter bar was the positioning of two plates at the tip with an inner bearing race. A sprocket acting as an outer bearing race was then located at the tip. The sprocket nose may generally be considered an improvement to the roller nose. It differed in construction from the roller nose but the intention was the same, namely the reduction of friction at the tip. The sprocket nose has a sprocket at the bar tip running on a bearing assembly designed so that the chain drive links rest in a sprocket V, thus holding it in place and suspending it away from the tip radius formed by the two outer plates. Because the drive links rest in the V's of the sprocket, that is between adjacent teeth, the chain does not come into contact with the two outer plates and the only chain contact at the tip is the engagement of the drive links in the sprocket.

Unfortunately, the sprocket is susceptible to breaking during use. The chain drive links rotate in the sprocket and inflict a tremendous load to the sprocket when boring with the tip. There is continual contact with the tip and the wood and this contact exerts considerable force. Thus, wear occurs in the sprockets, in the parts between adjacent teeth, due to continual contact with the saw chain drive links. This eventually weakens the sprocket to the point of breakage.

The increase in chain speed of the latest saws, and the lack of lubrication at the bearing area causes friction, heating and eventual failure. While the sprocket teeth are being worn down the pitch of the chain changes to accommodate the wear. Thus, on an eleven tooth sprocket 0.02 to 0.04 inches wear may be evident on each V. When multiplied by a eleven teeth, such as present on a tip of the sprocket, the sprocket could be out of pitch by up to 0.044 inches. This will not break the chain immediately because the chain will have stretched to accommodate the wear in the sprocket. However, if a new chain of a proper pitch is installed, the effect is frequently to break the weakened sprocket. When a chain is run loosely, which is quite normal, the chain has a tendency to loop away from the top of the bar by centrifugal force and when the chain drive links enter the sprocket, they do so with considerable force, hammering on the V part of the sprocket, that is the part between the teeth, and eventually breaking the sprocket.

There are therefore, weaknesses in the sprocket nose tip even though the idea is sound. Many attempts to avoid the above disadvantages have been carried out, mainly attempts to improve the quality of the material from which the sprocket is made to make the sprockets stronger.

SUMMARY OF THE INVENTION

The following U.S. patents demonstrate the prior art in setting out specific arrangements for reducing the effects of friction at the tip of a chain U.S. Pat. No. 3,263,715, Dobbertin
U.S. Pat. No. 3,765,088, Arff
U.S. Pat. No. 3,987,544, Gibson
U.S. Pat. No. 4,492,030, Beerens
U.S. Pat. No. 4,361,960, Halverson
U.S. Pat. No. 4,486,953, Halverson
U.S. Pat. No. 4,557,054, Beerens
U.S. Pat. No. 4,561,181, Weisberger
U.S. Pat. No. 4,651,424, Yamada Of the above patents Arff shows a roller nose for a chain saw that, generally, may be considered to be a conventional roller nose. Another roller nose is shown by Beerens. In Beerens the roller nose is asymmetrical, having a roller on one side and a conventionally stationary bar on the other side. The remaining patents generally show different types of sprocket noses. They may be summarized as having, in generally, a central sprocket with side supports.

The present invention seeks to provide a means of avoiding the disadvantages of the prior art systems and, accordingly, is a nose roller tip of a cutter bar of a chain saw comprising:

a mounting web to engage the cutter bar;

a pair of rollers, each roller mounted on a opposed sides of the mounting web;

outer plates, one adjacent each roller;

means attaching the mounting web, rollers and outer plates together to allow free rotation of the roller relative to the nose roller tip.

BRIEF DESCRIPTION OF THE DRAWINGS

Aspects of the invention are illustrated, merely by way of example, in the drawings in which:

FIG. 3 is an exploded view illustrating the present invention.

DESCRIPTION OF THE PREFERRED EMBODIMENTS

The drawings show a nose roller tip for a cutter bar 10 of a chain saw. Details of the chain saw are not shown. The chain saw is entirely conventional and, indeed, the tip according to the present invention is appropriate for use with any chain saw.

Figure 1:
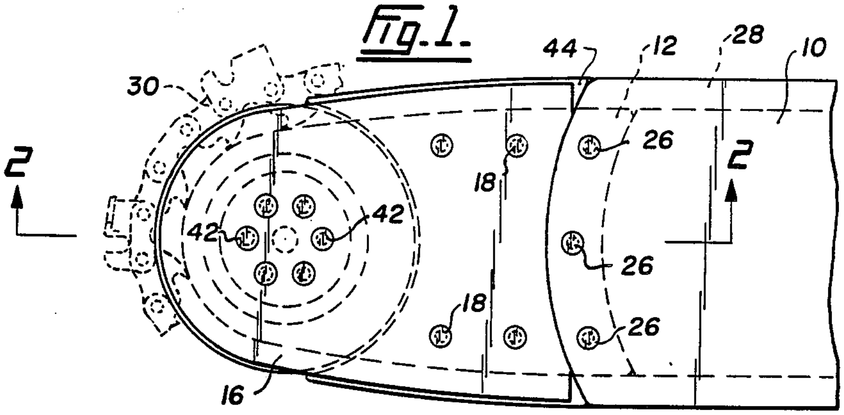
FIG. 1 is a side elevation of a nose bar tip according to the present invention.
Figure 2:
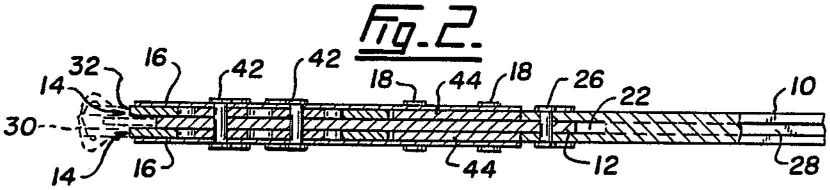
FIG. 2 is a section 2—2 in FIG. 1.
Figure 2:
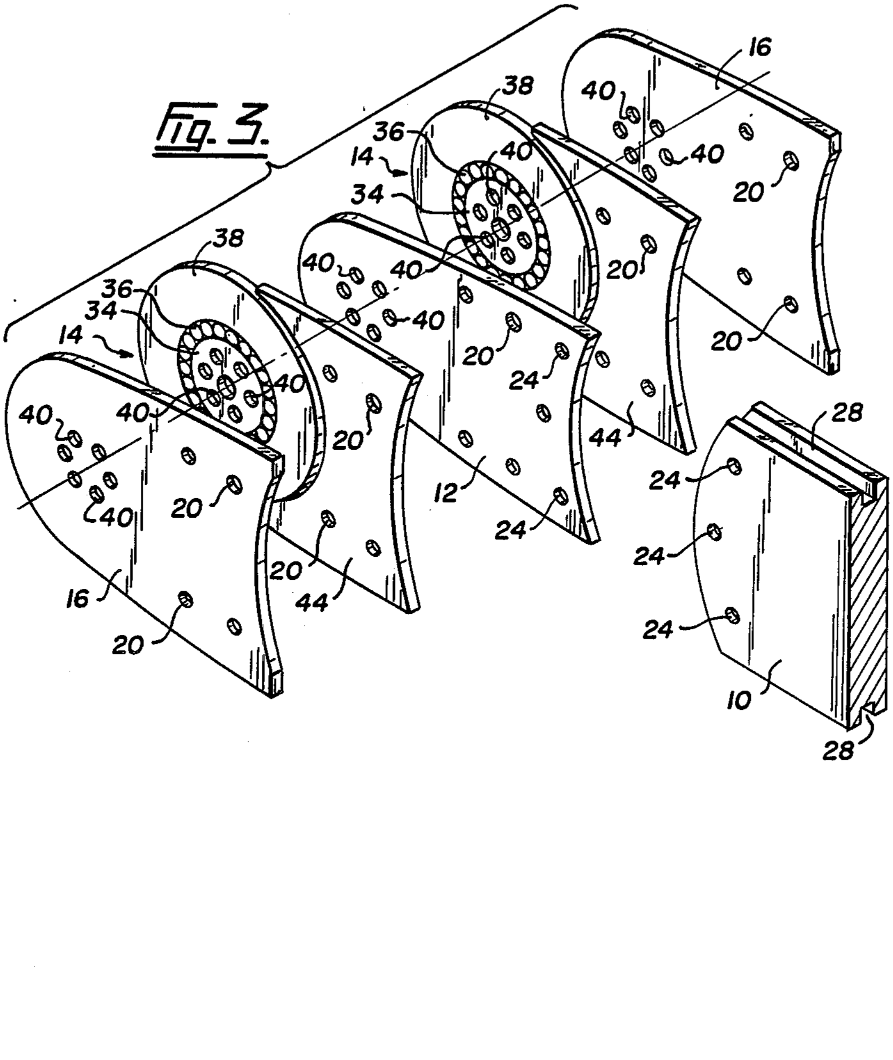

The illustrated tip comprises a mounting web 12 to engage cutting bar 10. There are a pair of rollers 14, each roller mounted on a side of the mounting web 12 as shown particularly in FIGS. 2 and 3. There are outer plates 16, one adjacent each roller 14. There are means of attaching the mounting web 12, rollers 14 and outer plates 16 together to allow free rotation of the rollers 14 relative to the nose roller tip. As shown particularly in FIG. 2, the means attaching web, rollers and outer plates together may comprise simple rivets 18 for which holes 20 are provided. The mounting web 12 engages a slot 22 in the cutter bar 10. For this purpose the cutter bar and the mounting web are provided with holes 24 to receive rivets 26 as shown particularly in FIG. 2. It should, of course, be noted that the cutter bar 10 is provided with a conventional slot 28 on its edges to guide the conventional chain 30. For the same purpose the mounting web 12 is retracted at 32 to provide a channel between the rollers 14 to locate the chain as shown particularly in FIG. 2.

As shown in FIG. 3, each roller 14 comprises an inner race 34 with bearings 36 at the periphery of the inner race 34. Roller bearings are illustrated. There is an outer race 38 to rotate on the bearings 36. The outer race 38 contacts the underside of the chain 30 as shown particularly in FIG. 2. The inner race 34 is located between outer plate 16 and the mounting web 12 by the position of holes 40 to receive rivets 42 as shown most clearly in FIGS. 2 and 3.

In the illustrated preferred embodiment there is a wear plate 44 located between the mounting web 12 and each outer plate 16 behind each roller 14.

Thus, the present invention shows two independent rollers, each with a bearing assembly held inwardly by mounting web 12 and outwardly by the plates 16. This structure is held together through two inner bearing races. The holding together may be by rivets or by bolts, rivets being preferred. The web acts as an inner bearing race for both bearing assemblies and is mounted to the bar.

Compared with prior art roller nose tips it should be noted that in the prior art system two rollers and the inner race rotate together with one set of roller bearings inside and against the circumference of the tip of the inner web. According to the invention the inner bearing race is non-rotating and is held by rivets through the race against the two outer plates. There are two sets of bearing races. The two rollers rotate independently, each on their own set of inner races and bearings.

The structure of the present invention is stronger then the prior art in that the mounting web is a full plate. It is longer and wider than provided for in the prior art. The two outer plates on each side of the web also increase the strength.

The use of two bearing races ensures more even distribution of the load.

Furthermore, in the preferred embodiment the wear plates, which are in line with the roller, take a large proportion of the wear, reducing the load on the rollers. Finally, the addition of the two outer plates 16 gives more lateral strength.

Compared with the sprocket tips of the prior art, where the drive links rest in the V of the sprocket the assembly of the present invention ensures that the underside of the chain contacts the rollers. There is free rotation of the chain around the bar tip. On a sprocket tip a particular pitch sprocket is required to match the chain pitch. The tip according to the present invention accepts all pitch chains of the same drive link thickness. There are three drive link thicknesses in current chains, 0.050, 0.058 and 0.63 inches, and in the industry only two models of tip are used, one for the 0.050 and 0.058 and one for 0.063 inches. The present invention permits the provision of the correct tip for every chain.

Each independent roller assembly according to the invention has a grease hole to lubricate the bearing race. Although the simple rivetting of the web 12 to the bar 10 is shown each bar manufacturer has its own version of mounting a tip to the bar. The present invention is adaptable to fit any type of bar tip mounting.

I claim:

1. A nose roller tip for a cutter bar of a chain saw comprising:
- a mounting web to engage the cutter bar;
- a pair of rollers, each roller mounted on opposed sides of the mounting web;
- a pair of outer plates, each outer plate being adjacent a roller and substantially overlapping and covering said roller such that said roller is located between the outer plate and the mounting web;
- means attaching the mounting web, rollers and outer plates together to allow free rotation of the rollers relative to the nose roller tip.

2. A nose roller tip as claimed in claim 1 in which the mounting web engages a slot in the cutter bar;
- means to locate the mounting web in said slot.

3. A nose roller tip as claimed in claim 2 in which the mounting web is riveted in position in the cutter bar.

4. A nose roller tip as claimed in claim 1 in which the mounting web is recessed to provide a channel between the rollers to locate the chain.

5. A nose roller tip as claimed in claim 1 in which each roller comprises an inner race;
- bearings at the periphery of the inner race;
- an outer race to rotate on the bearings.

6. A nose roller tip as claimed in claim 1 including a wear plate located between the mounting web and each outer plate, behind each roller.

* * * * *